United States Patent
Kuwayama

(10) Patent No.: US 10,836,213 B2
(45) Date of Patent: *Nov. 17, 2020

(54) TIRE

(71) Applicant: BRIDGESTONE CORPORATION, Chuo-ku, Tokyo (JP)

(72) Inventor: Isao Kuwayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 689 days.

This patent is subject to a terminal disclaimer.

(21) Appl. No.: 15/031,360

(22) PCT Filed: Jul. 7, 2014

(86) PCT No.: PCT/JP2014/003601
§ 371 (c)(1),
(2) Date: Apr. 22, 2016

(87) PCT Pub. No.: WO2015/063978
PCT Pub. Date: May 7, 2015

(65) Prior Publication Data
US 2016/0280010 A1 Sep. 29, 2016

(30) Foreign Application Priority Data

Oct. 29, 2013 (JP) .................................. 2013-224532

(51) Int. Cl.
*B60C 9/20* (2006.01)
*B60C 9/22* (2006.01)
(Continued)

(52) U.S. Cl.
CPC .............. *B60C 9/20* (2013.01); *B60C 9/2009* (2013.01); *B60C 9/22* (2013.01); *B60C 9/28* (2013.01);
(Continued)

(58) Field of Classification Search
CPC ..... Y10T 152/10792; Y10T 152/10801; B60C 2009/2012; B60C 2009/2016; B60C 2009/2019; B60C 2009/2022
(Continued)

(56) References Cited

U.S. PATENT DOCUMENTS 4,234,031 A * 11/1980 Pommier .............. B60C 9/2006
152/534 X
4,263,956 A * 4/1981 Pommier .................. B60C 9/20
152/535 X
(Continued)

FOREIGN PATENT DOCUMENTS

| CN | 102548775 A | 7/2012 |
| CN | 102656025 A | 9/2012 |

(Continued)

*Primary Examiner* — Adrienne C. Johnstone
(74) *Attorney, Agent, or Firm* — Kenja IP Law PC

(57) ABSTRACT

A passenger vehicle pneumatic tire comprising: a carcass; and inclined belt layers and a circumferential belt layer, wherein: the inclined belt layers include at least two inclined belt layers having different tire widthwise widths; an inclination angle $\theta_1$ with respect to the tire circumferential direction of the cords forming the inclined belt layer having the widest width and an inclination angle $\theta_2$ with respect to the tire circumferential direction of the cords forming the inclined belt layer having the narrowest width satisfy correlations that $30° \leq \theta_1 \leq 85°$, $10° \leq \theta_2 \leq 30°$, and $\theta_1 > \theta_2$; and a tire widthwise width $W_1$ of the inclined belt layer having the widest width and a tire widthwise width $W_2$ of the inclined belt layer having the narrowest width satisfy a correlation that $W_2 \leq 0.6 W_1$.

6 Claims, 7 Drawing Sheets

(51) Int. Cl.
 *B60C 9/28* (2006.01)
 *B60C 9/30* (2006.01)
(52) U.S. Cl.
 CPC ........ *B60C 9/30* (2013.01); *B60C 2009/2012* (2013.01); *B60C 2009/2016* (2013.01); *B60C 2009/2019* (2013.01); *B60C 2009/2223* (2013.01); *Y10T 152/10792* (2015.01)
(58) Field of Classification Search
 USPC .................................................. 152/534, 535
 See application file for complete search history.

(56) References Cited

U.S. PATENT DOCUMENTS

| | | | | |
|---|---|---|---|---|
| 4,265,291 | A * | 5/1981 | Pommier | .................. B60C 9/20 152/534 X |
| 4,282,917 | A * | 8/1981 | Pommier | .................. B60C 9/20 152/535 X |
| 5,637,163 | A * | 6/1997 | Kobayashi | ................ B60C 9/20 152/534 X |
| 6,125,899 | A * | 10/2000 | Takahashi | ............. B60C 9/2006 152/534 X |
| 6,615,889 | B1 * | 9/2003 | Nakata | ..................... B60C 9/18 152/535 X |
| 7,987,882 | B2 * | 8/2011 | Kobayashi | ........... B60C 9/2006 152/535 X |
| 8,079,393 | B2 * | 12/2011 | Ishiyama | .................. B60C 9/26 152/534 X |
| 2004/0159387 | A1 * | 8/2004 | Kobayashi | ............ B60C 9/2009 152/534 X |
| 2010/0108226 | A1 * | 5/2010 | Matsumoto | ................ B60C 9/22 |
| 2013/0042953 | A1 * | 2/2013 | Kuwayama | ................ B60C 3/04 |
| 2013/0048173 | A1 * | 2/2013 | Kiwaki | .................... B60C 3/04 |
| 2015/0165823 | A1 * | 6/2015 | Iga | ........................... B60C 9/28 152/535 |
| 2016/0257168 | A1 * | 9/2016 | Kuwayama | ............... B60C 9/22 |
| 2016/0272007 | A1 * | 9/2016 | Hatanaka | .................. B60C 9/28 |
| 2017/0021669 | A1 * | 1/2017 | Kuwayama | |
| 2017/0028788 | A1 * | 2/2017 | Kuwayama | ............... B60C 9/22 |

FOREIGN PATENT DOCUMENTS

| | | | |
|---|---|---|---|
| EP | 1852276 | A1 | 11/2007 |
| JP | H0858310 | A | 3/1996 |
| JP | 2001301421 | A | 10/2001 |
| JP | 2006193032 | A | 7/2006 |
| JP | 2006321406 | A | 11/2006 |
| JP | 2006335242 | A | 12/2006 |
| JP | 2007045334 | A | 2/2007 |
| JP | 2012171423 | A | 9/2012 |
| WO | 2011065018 | A1 | 6/2011 |
| WO | WO-2011/122170 | A1 * | 10/2011 |
| WO | WO-2011/135774 | A1 * | 11/2011 |
| WO | 2013065322 | A1 | 5/2013 |
| WO | WO-2014010352 | A1 * | 1/2014 ............... B60C 9/28 |
| WO | WO-2015063974 | A1 * | 5/2015 |
| WO | WO-2015155992 | A1 * | 10/2015 |
| WO | WO-2015159538 | A1 * | 10/2015 |

* cited by examiner

Comparative

⇐ Lateral Force

Comparative

TIRE

TECHNICAL FIELD

This disclosure relates to a tire having increased cornering power.

BACKGROUND

Conventionally, it is known to dispose as reinforcing members of tire for passenger vehicle an inclined belt layer having cords inclined with respect to a tire circumferential direction, and a circumferential belt layer having cords extending along the tire circumferential direction, on a tire radial outer side of a crown portion of a carcass extending between bead portions. Namely, by ensuring tire circumferential stiffness via the circumferential belt layer, diameter increase is suppressed particularly during high speed driving, while, by ensuring the tire widthwise stiffness via the inclined belt layers, cornering power, which is an indicator for vehicle steering stability, is obtained.

Here, it has been attempted to ensure tire widthwise stiffness of a tread while increasing the cornering power. For example, increase of the cornering power during cornering of a vehicle was attempted by increasing an inclination angle of cords of the inclined belt layer with respect to the tire circumferential direction. More specifically, by increasing the inclination angle of cords of the inclined belt layers with respect to the tire circumferential direction, out-of-plane bending stiffness in the tire circumferential direction is reduced, contact length of the tread is extended, and thus it becomes possible to increase the cornering power.

SUMMARY

Technical Problem

However, if the cord inclination angle of the inclined belt layer is increased as such, vibration mode of the tire changes and a large noise emission is generated from the tread surface, thus causing a new problem of deterioration in vehicle exterior noise performance (hereinafter referred to as merely "noise performance").

Thus, this disclosure is to provide a passenger vehicle pneumatic tire having increased cornering power and improved noise performance.

Solution to Problem

The subject of this disclosure is as follows.

(1) The passenger vehicle pneumatic tire of this disclosure includes: a carcass toroidally extending between a pair of bead portions; and inclined belt layers having cords inclined with respect to a tire circumferential direction and a circumferential belt layer having cords extending along the tire circumferential direction, the inclined belt layers and the circumferential belt layer being disposed on a tire radial outer side of a crown portion of the carcass, wherein: the inclined belt layers include at least two inclined belt layers having different tire widthwise widths; an inclination angle $\theta_1$ with respect to the tire circumferential direction of the cords forming the inclined belt layer having the widest width and an inclination angle $\theta_2$ with respect to the tire circumferential direction of the cords forming the inclined belt layer having the narrowest width satisfy correlations that $30° \leq \theta_1 \leq 85°$, $10° \leq \theta_2 \leq 30°$, and $\theta_1 > \theta_2$; and a tire widthwise width $W_1$ of the inclined belt layer having the widest width and a tire widthwise width $W_2$ of the inclined belt layer having the narrowest width satisfy a correlation that $W_2 \leq 0.6 W_1$.

According to the tire of this disclosure which has such configuration, it is possible to reduce the out-of-plane bending stiffness in the tire circumferential direction, increase the cornering power, and simultaneously improve the vehicle exterior noise performance. Here, the out-of-plane bending stiffness in the tire circumferential direction refers to stiffness against deformation generated in a direction perpendicular to a belt surface (a tire radial direction).

Here, "extending along the tire circumferential direction" is inclusive of cases where the cords are parallel to the tire circumferential direction, and cases where the cords are slightly inclined with respect to the tire circumferential direction (an inclination angle with respect to the tire circumferential direction being 5° or less) as a result of forming a belt layer by spiral winding a strip having cords coated with rubber.

The tire of this disclosure is provided for use by mounting to an applicable rim. The "applicable rim" is a valid industrial standard for the region in which the tire is produced or used, and refers to a standard rim of an applicable size (the "Measuring Rim" in the STANDARDS MANUAL of ETRTO, and the "Design Rim" in the "YEAR BOOK" of TRA) according to the "JATMA Year Book" in Japan, the "ETRTO STANDARDS MANUAL" in Europe, or the "TRA YEAR BOOK" in the United States of America.

The tire widthwise widths, etc. of the inclined belt layers and the circumferential belt layer in this disclosure refer to values measured at an unloaded state, in which the tire is mounted to the applicable rim, while an air pressure corresponding to a maximum load capability at an applicable size and ply rating as described in JATMA, etc. (hereinafter referred to as "predetermined air pressure") is filled.

(2) The passenger vehicle pneumatic tire of this disclosure preferably satisfies a correlation that $W_2 \geq 0.25 W_1$. According to this configuration, the cornering power can be increased sufficiently.

(3) In the tire of this disclosure, the inclined belt layers preferably consist of only a wide-width inclined belt layer and a narrow-width inclined belt layer. According to this configuration, it is possible to ensure sufficient durability, and simultaneously reduce the weight of the tire.

Advantageous Effect

According to this disclosure, it is possible to provide a tire having increased cornering power and improved noise performance.

DETAILED DESCRIPTION

Figure 1:
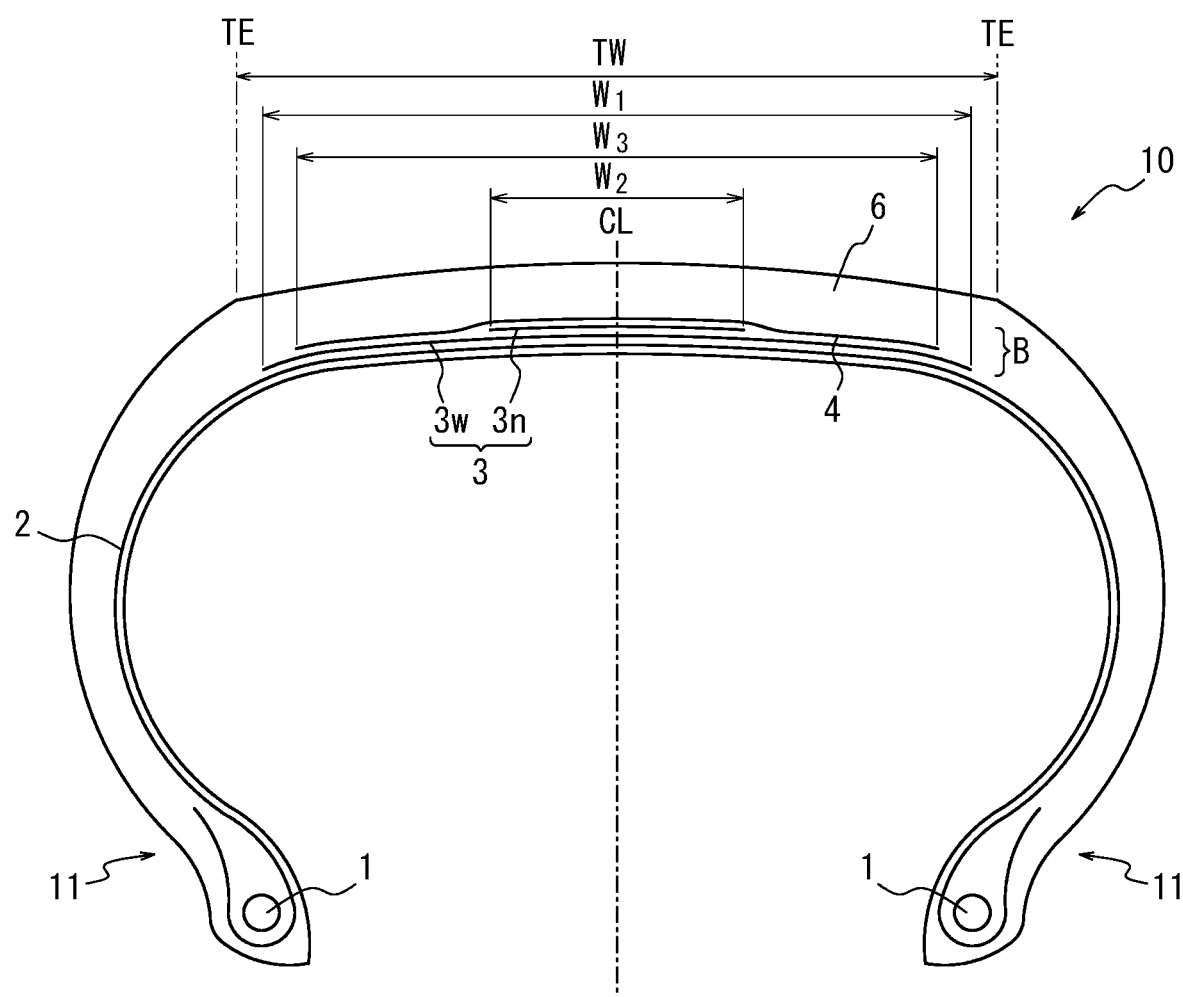
FIG. 1 illustrates a tire widthwise sectional view of a tire according to an embodiment of this disclosure.

Hereinafter, by referring to the drawings, the passenger vehicle pneumatic tire (i.e. pneumatic tire for passenger vehicle) of this disclosure (hereinafter referred to as merely "the tire") is described in details by exemplifying an embodiment thereof.

FIG. 1 illustrates a tire widthwise section of the tire according to an embodiment of this disclosure. This tire 10 includes a carcass 2, a belt B and a tread 6, the carcass 2 toroidally extending between a pair of bead portions 11, the belt B including inclined belt layers 3 (in the drawing, two inclined belt layers 3w, 3n) and a circumferential belt layer 4 (one layer in the drawing) on a tire radial outer side of a crown portion of the carcass 2, the inclined belt layers 3 having cords extending inclined with respect to a tire circumferential direction, the circumferential belt layer 4 having cords extending along the tire circumferential direction. More specifically, tire widthwise widths of the two inclined belt layers 3 are different to each other, and the belt layer 3n having a narrowest width, of which the tire widthwise width is $W_2$, is located on a circumferential outer side of the inclined belt layer 3w having a widest width, of which the tire widthwise width is $W_1$.

Figure 2:
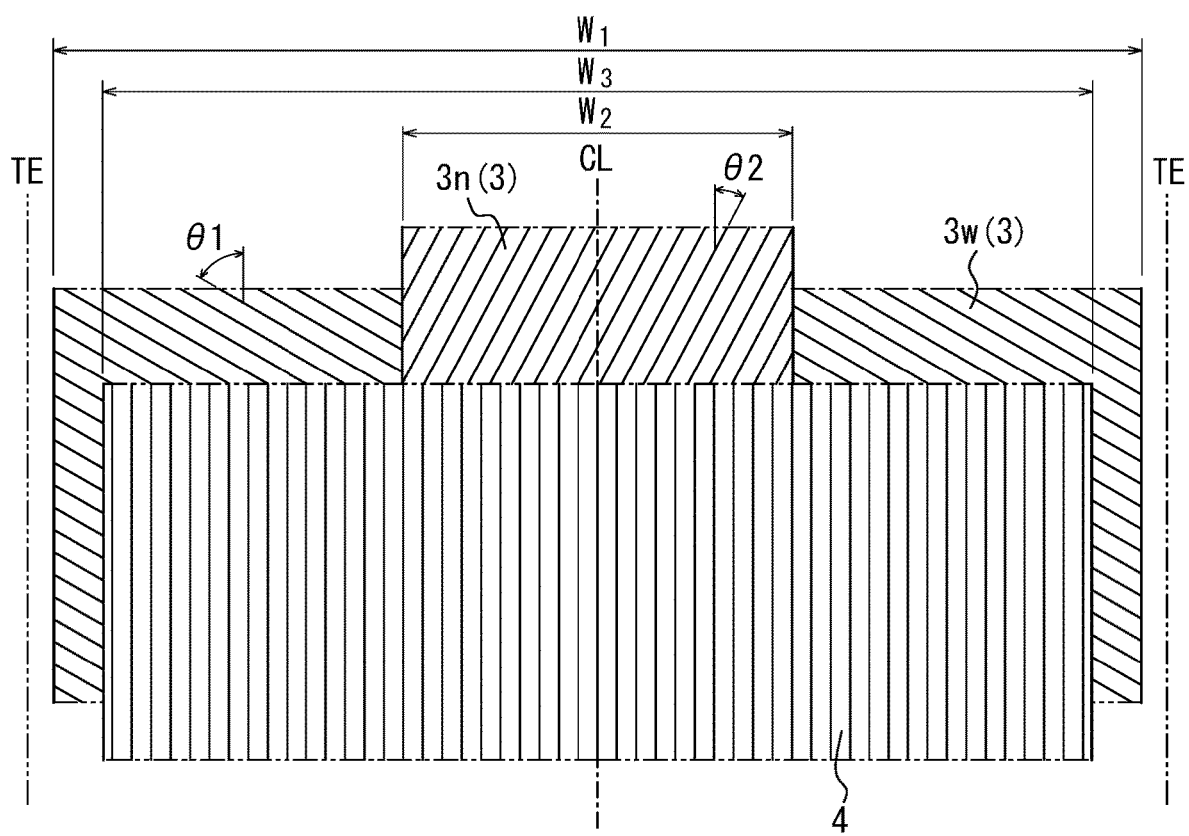
FIG. 2 illustrates a belt structure of the tire of FIG. 1.

FIG. 2 illustrates a planar view of the structure of the belt B of the tire 10 as illustrated in FIG. 1. As mentioned above, on a circumferential outer side of the carcass 2 (not illustrated), the inclined belt layer 3w having the widest width and the inclined belt layer 3n having the narrowest width overlap with the circumferential belt layer 4 in a manner that tire widthwise center lines of these belt layers are located on a tire equatorial plane CL.

In the tire of this disclosure, it is important that the inclined belt layers include at least two inclined belt layers having tire widthwise widths different to each other, the inclination angle $\theta_1$ with respect to the tire circumferential direction of the cords forming the inclined belt layer 3w having the widest width is $30°\leq\theta_1\leq85°$, and the inclination angle $\theta_2$ with respect to the tire circumferential direction of the cords forming the inclined belt layer having the narrowest width is $10°\leq\theta_2\leq30°$, which satisfies $\theta_1>\theta_2$.

By setting the inclination angle $\theta_1$ with respect to the tire circumferential direction of the cords forming the inclined belt layer 3w having the widest width to 30° or more, an elongation in the circumferential direction of the rubber increases when the tread surface of the tread 6 is deformed. Therefore, it is possible to ensure sufficient contact length of the tire, and as a result, it is possible to increase the cornering power and to achieve high cornering performance.

Figure 5:
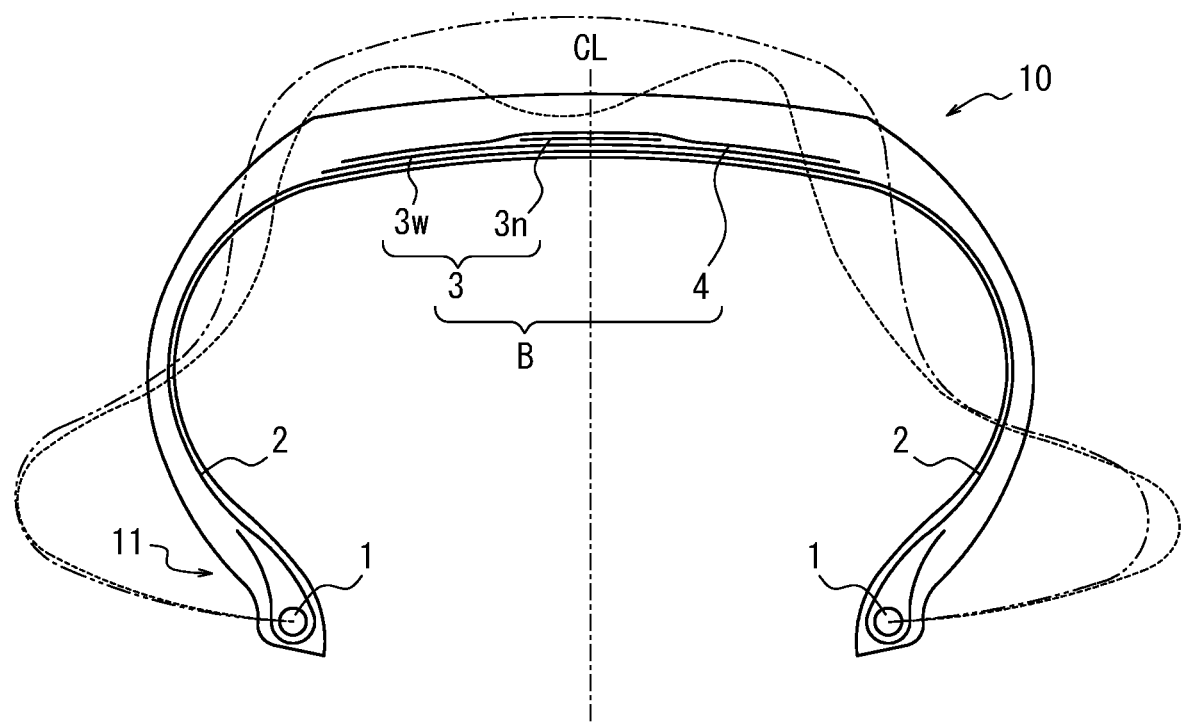
FIG. 5 illustrates the effect due to a preferable configuration of this disclosure.

However, if the inclination angle $\theta_1$ with respect to the tire circumferential direction of the cords in the inclined belt layer 3w having the widest width is set to such large value, a noise emission is generated and vehicle exterior noise performance tend to be deteriorated due to change of vibration mode of the tire. More specifically, in a high frequency region of 400 Hz to 2 k Hz, many tires having cords of an inclined belt layer inclined at an angle with respect to a tire circumferential direction of approximately 30° or more and 85° or less are deformed such that the entire tread surface greatly vibrates (illustrated with a two-dot chain line in FIG. 5) in primary, secondary, tertiary, etc. vibration modes in a sectional direction. Therefore, a large noise emission is generated.

Therefore, among the plurality of belt layers 3, by setting the inclination angle $\theta_2$ with respect to the tire circumferential direction of the cords in the inclined belt layer 3n having the narrowest width to be less than the inclination angle $\theta_1$ with respect to the tire circumferential direction of the cords in the inclined belt layer 3w having the widest width, and by setting it to 10° or more and 30° or less, an out-of-plane bending stiffness in the tire circumferential direction in a vicinity of the tire equatorial plane is maintained appropriately. Therefore, it is possible to suppress vibration of the tread surface due to the aforementioned vibration mode. Namely, as a result of suppressing expansion of the tread 6 to the tire circumferential direction in the vicinity of the tire equatorial plane, it is possible to reduce noise emission (illustrated with dashed line in FIG. 5).

By setting the inclination angle $\theta_2$ to 10° or more, it is possible to maintain the out-of-plane bending stiffness in the tire circumferential direction, without inhibiting the effect of ensuring the contact length in the inclined belt layer 3w having the widest width. Moreover, by setting the inclination angle $\theta_2$ to 30° or less, the out-of-plane bending stiffness in the tire circumferential direction in the vicinity of the tire equatorial plane is maintained sufficiently, and thus it is possible to ensure reduction of generation of noise emission.

Further, from the viewpoint of increasing the cornering power and simultaneously suppressing generation of noise emission and improving the vehicle exterior noise performance by, it is more preferable to use the ranges $30°\leq\theta_1\leq60°$ and $15°\leq\theta_2\leq25°$.

In addition to the aforementioned requirements to cord inclination angles, in the tire of this disclosure, it is important that the tire widthwise width $W_1$ of the inclined belt layer having the widest width and the tire widthwise width $W_2$ of the inclined belt layer having the narrowest width satisfy a correlation that $W_2\leq0.6W_1$.

As mentioned above, on the tire radial outer side of the vicinity of the tread equatorial plane, if the width of the region having a larger out-of-plane bending stiffness in the tire circumferential direction becomes too large, the tread becomes more likely to vibrate uniformly, and thus the reduction effect in noise emission is reduced. Thus, by setting the tire widthwise width $W_2$ of the inclined belt layer having the narrowest width to 60% or less of the tire widthwise width $W_1$ of the inclined belt layer having the widest width, it is possible to improve the noise performance without inducing the mode in which the entire tread vibrates.

Figure 6A:
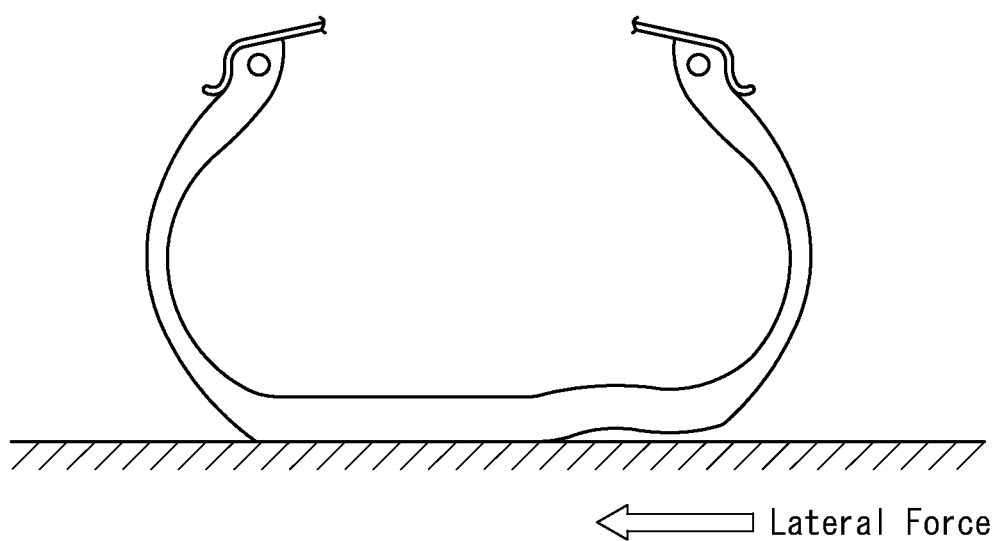
FIG. 6A illustrates a phenomenon that a tread rises in a comparative example tire.

The lateral force generated during cornering of a vehicle is ordinarily absorbed in a tread rubber portion of the tread 6, then a tread surface of the tread 6 is strongly pushed to the road surface, and thereby a cornering power is obtained. Therefore, in the case where insufficient load is applied to the tire in light of tire circumferential stiffness of the tire, the tread surface of the tread 6 is pushed to the road surface insufficiently, and as illustrated in FIG. 6A, a phenomenon occurs where a shoulder region of the tread 6 rises, and degree of increase in the cornering power is reduced.

Therefore, by setting the tire widthwise width of the inclined belt layer having the narrowest width, among the two inclined belt layers having tire widthwise widths different to each other, to a width of 60% or less of the tire widthwise width of the inclined belt layer having the widest width, it is possible to appropriately reduce the stiffness in the shoulder region of the tread 6. As a result, it is possible to suppress the aforementioned rise phenomenon.

Moreover, by using the range $W_2\leq0.6W_1$, the tire weight is reduced, and thus it is possible to reduce the rolling resistance of the tire as well.

In the embodiment as illustrated in FIGS. 1 and 2, among the two inclined belt layers, the tire widthwise width of the inclined belt layer on the tire radial outer side is set smaller than the inclined belt layer on the tire radial inner side. However, the tire widthwise width of the inclined belt layer on the tire radial outer side may be set larger than the inclined belt layer on the tire radial inner side as well. Further, the number of the inclined belt layers may be 3 or more as well. In this case, if the tire widthwise width $W_1$ of the inclined belt layer having the widest width and the tire widthwise width $W_2$ of the inclined belt layer having the narrowest width satisfy the correlation $W_2 \leq 0.6W_1$, inclined belt layers having the same width may be included as well.

In the tire of this disclosure, the tire widthwise width $W_1$ of the inclined belt layer 3w having the widest width and the tire widthwise width $W_2$ of the inclined belt layer 3n having the narrowest width preferably satisfy the correlation $W_2 \geq 0.25W_1$.

By disposing the inclined belt layer 3n having the narrowest width which satisfies $W_2 \geq 0.25W_1$, the belt stiffness in the vicinity of the tire equator is maintained sufficiently, hence it is possible to suppress spread of the tread 6 to the tire circumferential direction and reduce the noise emission, and simultaneously, ensure increase of the cornering power.

It is more preferable that $W_2 \geq 0.4W_1$ is satisfied, from the viewpoint of ensuring increase in the cornering power and reduction in the noise emission, and more preferable that $W_2 \leq 0.55W_1$ is satisfied, from the viewpoint of preventing reduction in degree of increase of the cornering power under low applied load.

In the tire of this disclosure, the inclined belt layer 3 preferably consist of only an inclined belt layer having a wider width (3w in the example of FIG. 2) and an inclined belt layer having a narrower width (3n in the example of FIG. 2). In general, in a tire for passenger vehicle, since a requirement level for durability is not as high as, e.g., heavy-duty tire, it is possible to ensure sufficient durability even in a belt structure having two inclined belt layers. Further, it becomes possible to reduce the weight of the tire.

Figure 7:
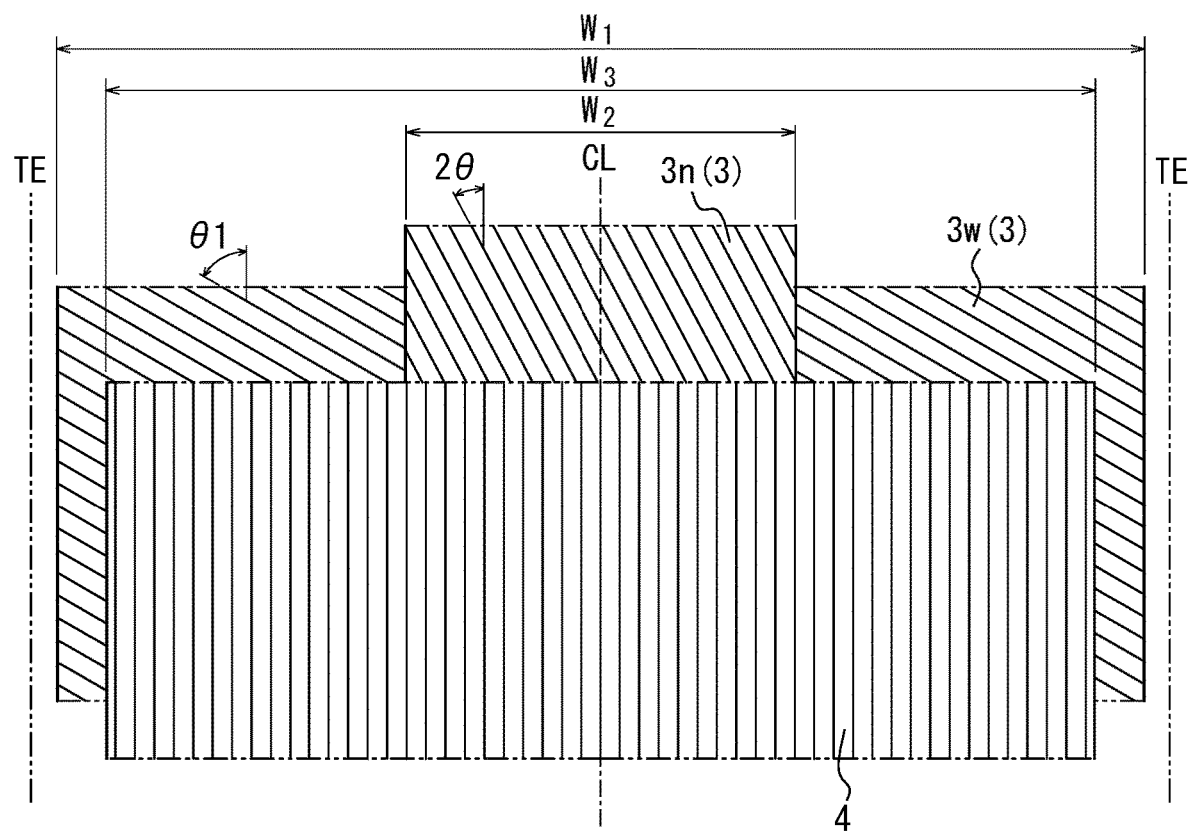
FIG. 7 exemplifies another mode of the belt structure of the tire of FIG. 1.

In the example illustrated in FIG. 2, extending directions of the cords of the inclined belt layers 3n and 3w are opposite to each other (namely, in FIG. 2, the cords of the inclined belt layer 3n extend in a direction rising up to the right, and the inclined belt layer 3w extend in a direction rising up to the left), while on the other hand, as illustrated in FIG. 7, it is possible as well to set the extending directions of the cords of all the belt layers (two in the example of FIG. 2) to the same direction (a direction rising up to the left in the example of FIG. 7).

As illustrated in FIG. 2, by setting the extending directions of the cords of the inclined belt layers 3n and 3w to directions opposite to each other, a shear force is applied between the two inclined belt layers during cornering of a vehicle. Therefore, it is possible to obtain particularly excellent cornering power.

Moreover, as illustrated in FIG. 7, by setting the extending directions of the cords of the inclined belt layers 3n and 3w to the same direction, the shear force applied between the two inclined belt layers is decreased. Therefore, it is possible to obtain particularly excellent rolling resistance.

The expression "the extending direction of the cord being the same" used herein does not mean that the inclination angles of the cords with respect to the tire equatorial plane CL are the same, but means that all cords of a plurality of inclined belt layers rise up to the right or rise up to the left, in a planar view of the tread.

Figure 3:
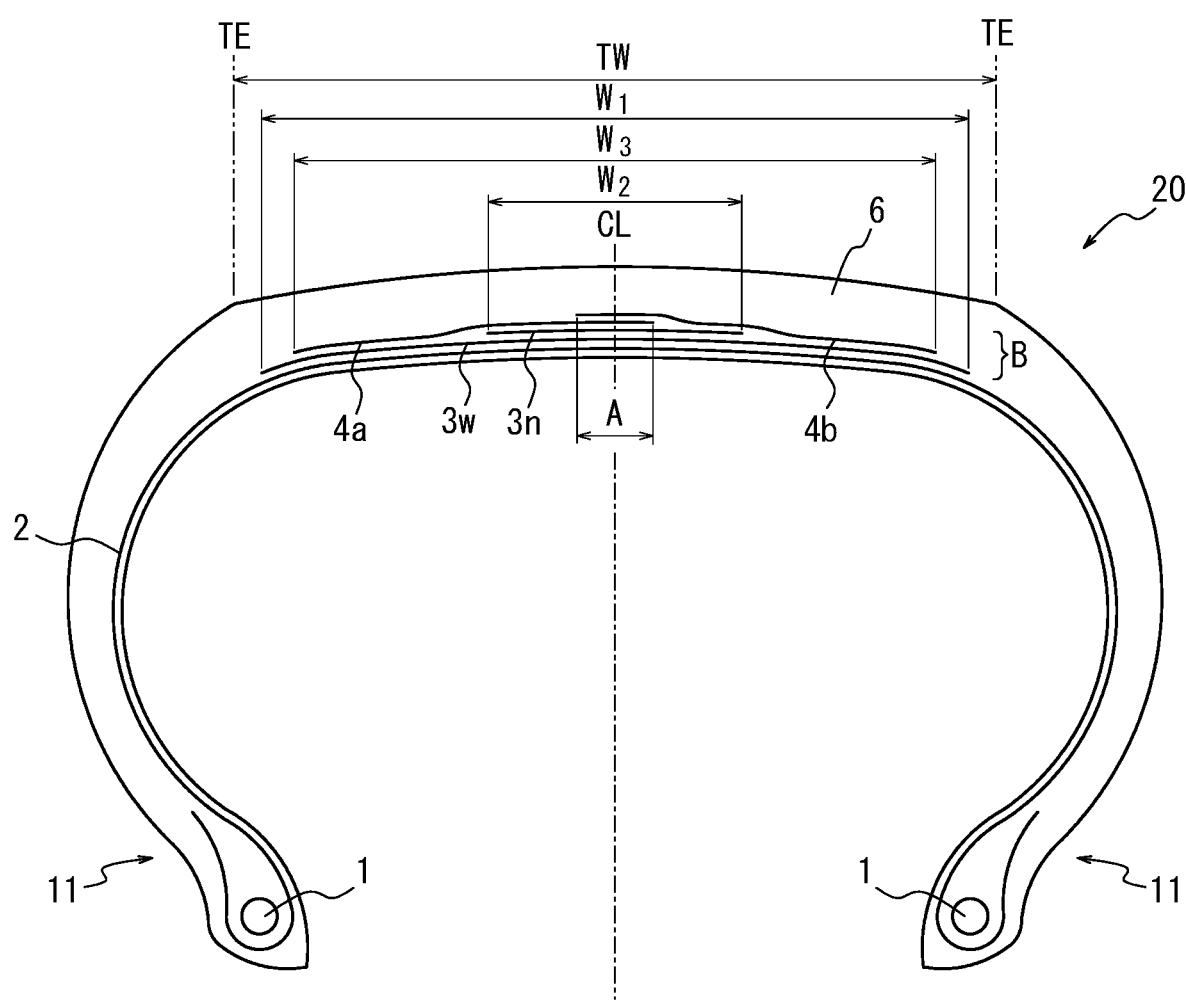
FIG. 3 illustrates a tire widthwise sectional view of a tire according to another embodiment of this disclosure.

Next, FIG. 3 illustrates a tire widthwise section of a tire according to another embodiment of this disclosure. The points which are the same as the aforementioned embodiment are omitted in the description.

This tire 20 includes a belt B and a tread 6 on a tire radial outer side of a carcass 2 toroidally extending between bead portions 11, the belt B including belt layers 3 (two inclined belt layers 3w and 3n in the drawing) and a circumferential belt layer 4 (circumferential belt layers 4a and 4b separated in the tire width direction in the drawing).

Figure 4:
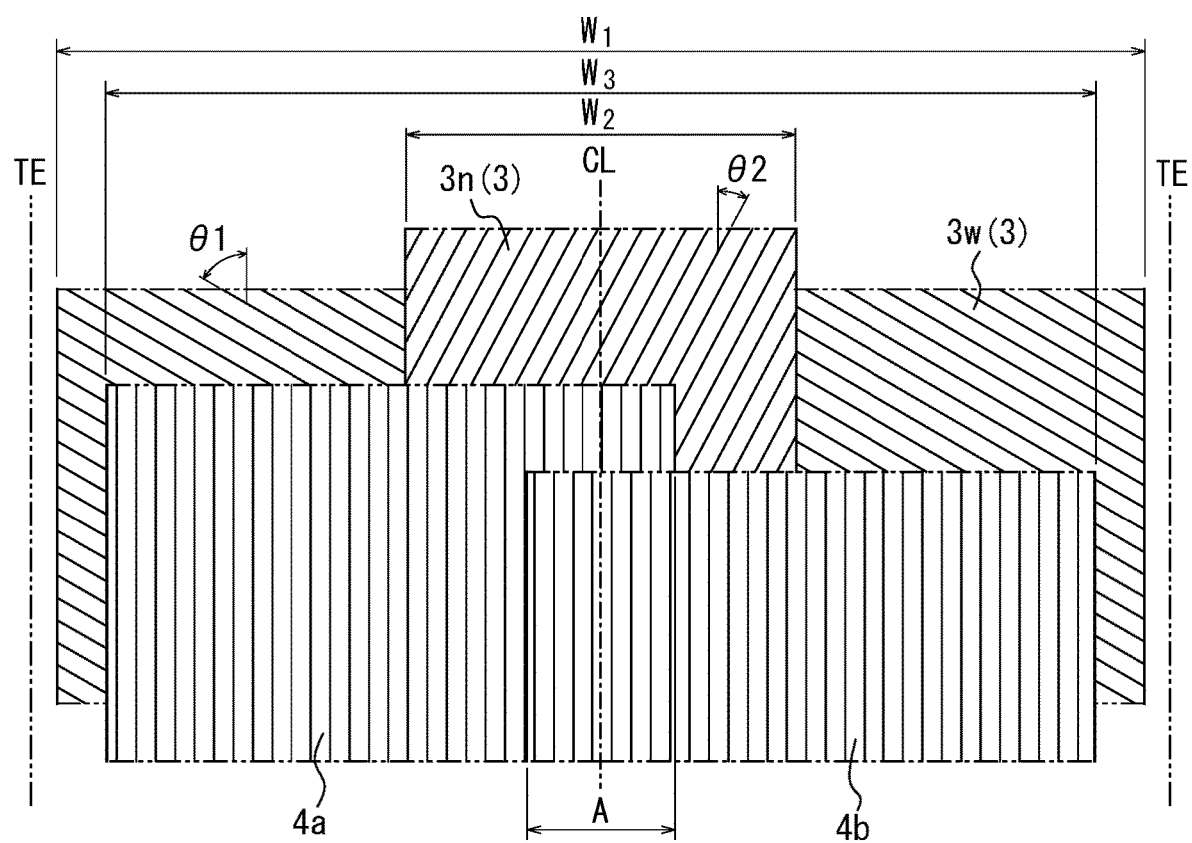
FIG. 4 illustrates a belt structure of the tire of FIG. 3.

Referring to FIG. 4, which illustrates the structure of the belt B of the tire 20 in a planar view, on a circumferential outer side of an inclined belt layer 3 of the tire 20, there are provided a circumferential belt layer 4a, which extends from the vicinity of a tread edge TE to a tire equatorial plane CL and terminates beyond the tire equatorial plane CL, and a circumferential belt layer 4b, which extends from the vicinity of the other tread edge TE toward the tire equatorial plane and terminates by overlapping with an end portion of the circumferential belt layer 4a in the tire radial direction. Note that although the circumferential belt layers 4a and 4b are disposed symmetrically with respect to the tire equatorial plane in the drawing, they may be disposed asymmetrically as well.

In this way, the tire of this disclosure may have more circumferential belt layers in the vicinity of the tire equatorial plane than in the other regions if necessary. This is based on advantage for tire manufacture.

Further, in the case where a plurality of circumferential belt layers overlap with each other as illustrated in FIG. 3, a tire widthwise length A of an overlapping portion is preferably 30 mm or less from the viewpoint of suppressing reduction in the contact length. Note that by increasing circumferential belt layers in the vicinity of the tire equatorial plane, it becomes possible to contribute to the circumferential stiffness and thereby suppress a vibration mode which leads to deterioration in noise performance, and thus the circumferential belt layers may overlap with each other in a range of more than 30 mm.

From the viewpoint of advantage for manufacture, aside from the aforementioned overlapping portion having the tire widthwise length A, the circumferential belt layers may overlap within a range of 30 mm or less in a tire widthwise outer side end portion of the circumferential belt layer 4.

Referring to FIGS. 1 to 4, in this disclosure, the tire widthwise width $W_3$ of the circumferential belt layer 4 is preferably narrower than the tire widthwise width $W_1$ of the inclined belt layer 3w having the widest width. In the case where a tire widthwise width $W_3$ of a high-stiffness circumferential belt layer is larger than the tire widthwise width $W_1$ of the inclined belt layer having the widest width, the circumferential belt layer 4 and the carcass 2 become adjacent to each other in the tire radial direction. This is because, in this case, when the tread 6 contacts the ground, strain occurs between the carcass which tries to extend in the tire circumferential direction and the circumferential belt layer which tries to suppress the elongation in the tire circumferential direction, which might lead to deterioration in the rolling resistance.

The tire widthwise width $W_3$ of the circumferential belt layer 4 is preferably 90% or more and 115% or less of a tread width TW, and the tire widthwise width $W_1$ of the inclined belt layer 3w having the widest width is preferably 90% or more and 115% or less of the tread width, from the viewpoint of optimization of ground contact shape and improvement of ground contact performance.

Here, the tread width TW refers to a ground contact width when the tire is mounted to an applicable rim, with a predetermined air pressure filled and a load corresponding to a maximum load capability applied.

The number of the inclined belt layers having a wider width, which have a tire widthwise width as mentioned above, is preferably 1 to 3, and from the point of durability of the tire, is more preferably 1 or 2. This is for the reason that it is possible to sufficiently maintain the durability without causing weight increase. The number of the inclined belt layers having a narrow width other than the aforementioned inclined belt layers having a wider width is preferably 1, but may optionally be more than one.

In the circumferential belt layer 4, aramid cords, or hybrid cords of aramid and nylon, etc. may be used, and in the inclined belt layer 3, steel cords, etc. may be used.

In the belt structure illustrated in FIG. 4, extending directions of the cords of the inclined belt layers 3n and 3w are opposite to each other (namely, in FIG. 4, the cord of the inclined belt layer 3n extend in a direction rising up to the right, and the cords of the inclined belt layer 3w extend in a direction rising up to the left), while on the other hand, although not illustrated, it is possible as well to set the extending directions of the cords of all the belt layers (two in the example of FIG. 4) to the same direction, in the same way as the belt structure as illustrated in FIG. 7. The aforementioned effect is obtained by setting the extending directions of the cords of the inclined belt layer to be the same or different to each other.

The belt structure of this disclosure is particularly preferable to be applied to a pneumatic radial tire for passenger vehicles, in which when an internal pressure is 250 kPa or more, a ratio of a sectional width SW to an outer diameter OD of the tire SW/OD is 0.26 in the case where the sectional width SW of the tire is less than 165 mm, and the sectional width SW and an outer diameter OD of the tire satisfy a relation expression that OD≥2.135×SW+282.3 in the case where the sectional width SW of the tire is 165 mm or more.

As for a tire satisfying the aforementioned ratio and relation expression, namely a tire having a narrower width and larger diameter as compared with conventional pneumatic tires for passenger vehicle, although the rolling resistance is greatly improved, since the tread has a narrower width, the cornering power tends to be insufficient. By applying the configuration of this disclosure, it is possible to preferably increase the cornering power.

EXAMPLES

Examples of this disclosure are described hereinafter.

Tires of examples and comparative examples (both having a tire size of 165/60R19 and being pneumatic tires for passenger vehicle) were manufactured experimentally, and cornering power, rolling resistance and noise resistance thereof were evaluated.

Each sample tire was a tire including a belt and a tread, the belt having a carcass toroidally extending between a pair of bead portions, and having two inclined belt layers and one or more circumferential belt layers on a tire radial outer side of a crown portion of the carcass.

(Cornering Power)

Each sample tire was installed to a rim (having a size of 5.5J-19) and applied with an internal pressure of 300 kPa, and then was mounted to a vehicle and measured on a flat belt cornering machine. Here, the obtained cornering power was measured at a belt speed of 100 km/h and under 3 different load conditions, namely, under a load condition corresponding to a maximum load capability at applicable size and ply rating, under a load condition equal to 70% of the same, and under a load condition equal to 40% of the same.

(Noise Performance)

Each sample tire was mounted to a vehicle under the same conditions as mentioned above, and the noise level thereof was measured on a running test drum by rolling the drum at a speed of 100 km/h, via a mobile microphone. The results were as shown in Table 1. The result were evaluated by the difference in the noise level as compared with Comparative Example Tire 1. A lower value stands for a more excellent reduction effect of noise.

(Rolling Resistance)

Each sample tire was mounted to a vehicle under the same conditions as mentioned above, and the rolling resistance thereof was measured on a running test drum by rolling the drum at a speed of 100 km/h. The results were as shown in Table 1. The result were obtained via index evaluation with the rolling resistance of Comparative Example Tire 1 as 100. Here, smaller index means more excellent rolling resistance.

TABLE 1

Figure 6B:
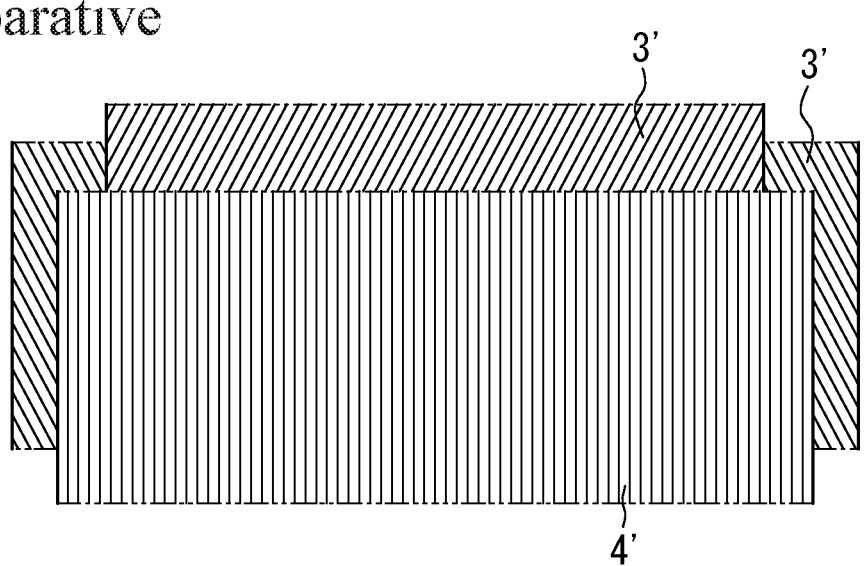
FIG. 6B illustrates a belt structure of a comparative example tire.

|  |  | Comparative Example 1 | Comparative Example 2 | Example 1 | Example 4 | Example 5 | Example 6 |
|---|---|---|---|---|---|---|---|
| Belt structure |  | FIG. 6A | FIG. 6B | FIG. 2 | FIG. 4 | FIG. 4 | FIG. 4 |
| Inclined belt layer having widest width | $\theta_1$ (°) | 28 | 60 | 60 | 60 | 60 | 60 |
|  | $W_1$ (mm) | 135 | 135 | 135 | 135 | 135 | 135 |
| Inclined belt layer having narrowest width | $\theta_2$ (°) | 28 | 60 | 16 | 16 | 16 | 16 |
|  | $W_2$ (mm) | 130 | 130 | 30 | 40 | 74 | 65 |
|  | $W_2/W_1$ | 0.96 | 0.96 | 0.22 | 0.30 | 0.55 | 0.48 |
| Circumferential belt layer | $W_3$ (mm) | 128 | 128 | 128 | 128 | 128 | 128 |
|  | Material | Aramid | Aramid | Aramid | Aramid | Aramid | Aramid |
| Contact width (mm) |  | 124 | 129 | 130 | 130 | 130 | 130 |
| Cornering power (INDEX) |  | 100 | 110 | 103 | 104 | 107 | 105 |
| Noise resistance (dB) |  | 0 | +3 | +1 | +1.5 | +2 | +1 |
| Rolling resistance (INDEX) |  | 100 | 95 | 92 | 92 | 95 | 94 |

In the Example Tires 1 and 4-6, by increasing the inclination angles of the cords of the inclined belt layers having wider widths with respect to the tire circumferential direction, the cornering power was increased, and the noise resistance was improved as well.

REFERENCE SIGNS LIST 1 bead core
2 carcass
3,3' inclined belt layer
3w inclined belt having widest width
3n inclined belt layer having narrowest width
4, 4', 4a, 4b circumferential belt layer
6 tread
10, 20 tire
11 bead portion
B belt
CL tire equatorial plane
TE tread end
TW tread width

The invention claimed is:

1. A passenger car pneumatic radial tire comprising:
a carcass toroidally extending between a pair of bead portions; and
inclined belt layers having cords inclined with respect to a tire circumferential direction and a circumferential belt layer having cords extending along the tire circumferential direction or inclined with respect to the tire circumferential direction at an angle of 5° or less, the inclined belt layers and the circumferential belt layer being disposed on a tire radial outer side of a crown portion of the carcass, wherein:
the inclined belt layers include at least two inclined belt layers having different tire widthwise widths;
an inclination angle $\theta_1$ with respect to the tire circumferential direction of the cords forming the inclined belt layer having the widest width and an inclination angle $\theta_2$ with respect to the tire circumferential direction of the cords forming the inclined belt layer having the narrowest width satisfy correlations that
$30° \leq \theta_1 \leq 85°$,
$10° \leq \theta_2 \leq 30°$, and
$\theta_1 > \theta_2$;
a tire widthwise width $W_1$ of the inclined belt layer having the widest width and a tire widthwise width $W_2$ of the inclined belt layer having the narrowest width satisfy a correlation that
$W_2 \leq 0.6 W_1$;
when the internal pressure of the tire is 250 kPa or more, a ratio of a sectional width SW to an outer diameter OD of the tire is 0.26 in the case where the sectional width SW of the tire is less than 165 mm, and the sectional width SW and an outer diameter OD of the tire satisfy a relation expression that OD≥2.135×SW+282.3 in the case where the sectional width SW of the tire is 165 mm or more,
the inclined belt layers consist of only the widest-width inclined belt layer and the narrowest-width inclined belt layer, and
the tire widthwise width $W_3$ of the circumferential belt layer is 90% or more and 115% or less of a tread width TW.

2. The passenger vehicle pneumatic tire according to claim 1, wherein the tire satisfies a correlation that $W_2 \geq 0.25 W_1$.

3. The passenger car pneumatic radial tire according to claim 1, wherein the circumferential belt layer is disposed on the tire radial outer side of the inclined belt layers.

4. The passenger car pneumatic radial tire according to claim 1, wherein the tire widthwise width $W_1$ of the inclined belt layer having the widest width is 90% or more and 115% or less of the tread width TW.

5. The passenger car pneumatic radial tire according to claim 1, wherein the cords of the circumferential belt layer either are aramid cords or are hybrid cords of aramid and nylon.

6. The passenger car pneumatic radial tire according to claim 1, wherein the circumferential belt layer includes two circumferential belt layer circumferentially continuous parts and on a circumferential outer side of the inclined belt layer, an axial end portion of one of the circumferential belt layer parts and the other circumferential belt layer part overlap in the tire radial direction at the tire equatorial plane so as to form a circumferentially continuous overlapping portion.

* * * * *